United States Patent Office 3,644,553
Patented Feb. 22, 1972

3,644,553
PROCESS FOR THE DECOMPOSITION OF A SOLUTION OF HYDROGEN FLUORIDE-BORON TRIFLUORIDE-XYLENES COMPLEX
Susumu Fujiyama and Fumisada Kosuge, Niigata-shi, Japan, assignors to Japan Gas-Chemical Company, Inc., Tokyo, Japan
Filed Dec. 8, 1969, Ser. No. 883,132
Claims priority, application Japan, Dec. 17, 1968, 43/92,022
Int. Cl. C07c 7/10
U.S. Cl. 260—674 A                10 Claims

ABSTRACT OF THE DISCLOSURE

An improved process for decomposing a complex solution at the time of separating xylenes by the formation of a complex of xylenes, hydrogen fluoride and boron trifluoride is disclosed. Inasmuch as only boron trifluoride and a part of hydrogen fluoride is recovered in vapor phase the use of utilities is minimized. The process is characterized by heating a solution of hydrogen fluoride-boron trifluoride-xylenes complex for a liquid residence time of 1–120 minutes at 2–30 kg./cm.$^2$ (absolute pressure) with the use of a multistage counter-counter gas-liquid contactor as a decomposer; withdrawing from the top of the decomposer a gas which contains boron trifluoride in higher concentration than in said complex solution; and also withdrawing from the bottom of the decomposer, together with xylenes, liquid hydrogen fluoride which contains substantially no boron trifluoride. A hydrocarbon diluent, when allowed to be co-present in the decomposition reaction, helps obtain still better results. Also, xylenes may be isomerized at the same time with the decomposition of said complex.

BACKGROUND OF THE INVENTION

Field of the invention

The present invention provides an improved process for decomposing xylenes-hydrogen fluoride-boron trifluoride complex solution at the time of separating xylenes by the formation of a complex of xylenes, hydrogen fluoride and boron trifluoride, or at the time of toluene disproportionation reaction by using boron trifluoride and hydrogen fluoride as catalyst

Description of the prior art

It is generally known that xylene isomers react with hydrogen fluoride and boron trifluoride to form a complex, which dissolves in a phase containing excess hydrogen fluoride. Of the xylene isomers, m-xylene most readily forms said complex, followed by o-xylene, p-xylene and ethylbenzene in the order given. Accordingly, depending on the amount of hydrogen fluoride and boron trifluoride added, it is possible to extract m-xylene alone into the hydrogen fluoride phase while leaving other xylene isomers in the hydrocarbon phase, or to leave ethylbenzene alone in the hydrocarbon phase while allowing m-xylene, o-xylene and p-xylene to be extracted into the hydrogen fluoride phase. By the time extraction is generally conducted with the mole ratio of boron trifluoride/hydrogen fluoride being in the range of 0.02–0.20. Accordingly, the molar ratio of xylenes, hydrogen fluoride and boron trifluoride in the complex solution is 1:5–20:0.3–2.0.

Further, as a result of a disproportionation reaction allowed to take place by heating toluene in the presence of hydrogen fluoride and boron trifluoride, benzene and xylenes are formed. In this instance a solution of m-xylene-hydrogen-fluoride-boron trifluoride complex is also formed. In that case in order to accelerate the reaction velocity, the mole ratio of boron trifluoride/hydrogen fluoride should be 0.25 or less, with 0.1–0.2 being preferred. It was known that it is possible to decompose the solution of xylenes complex thus obtained by heating, into hydrogen fluoride, boron trifluoride and xylenes (Japanese patent publication No. 6,577/66). In the prior art, all the boron trifluoride and hydrogen fluoride are vaporized by heating to retain xylenes alone in the liquid phase. However, the complex solution thus obtained in the above-mentioned process, is a dilute hydrogen fluoride solution of xylenes-hydrogen fluoride-boron trifluoride complex. Accordingly, to vaporize all the liquid hydrogen fluoride, which makes up the major portion of these solutions to be treated, and also to liquefy it by cooling so that it may be fed into an extractor or a disproportionation reaction apparatus, a substantial amount of heating and refrigeration energy is required.

SUMMARY OF THE INVENTION

The present invention eliminates the shortcomings mentioned above. Accordingly, one object of this invention is to reduce the amount of energy needed for decomposing the complex solution at the time of thermal decomposition of the hydrogen fluoride solution of said complex. This is achieved by allowing a gas containing boron trifluoride in higher concentration than in said complex solution to be vaporized out from the top of the decomposer and on the other hand as much hydrogen fluoride as possible withdrawn in the form of liquid, together with xylenes, from the bottom of the decomposer. Then, the hydrogen fluoride and xylenes are separated by phase separation or decantation after they have cooled.

The boiling point of boron trifluoride and hydrogen fluoride are −101.0° C. and +19.5° C., respectively. When compared in terms of the boiling point, boron trifluoride and hydrogen fluoride differ significantly in volatility and one might think they are readily separable. However, when xylenes exist in the system, the vapor pressure of boron trifluoride decreases because of the formation of a complex and becomes practically equal to that of hydrogen fluoride. The inventors have carried out research to develop a process for vaporizing as much boron trifluoride alone as possible by heating said complex solution, and discovered that this can be done by heating said complex solution using a multi-stage countercurrent gas-liquid contactor as decomposer under a pressure of 2–30 kg./cm.$^2$ (absolute pressure), with 3–15 kg./cm.$^2$ (absolute pressure) being preferred and for a residence time of 1–120 minutes, with 5–60 minutes being preferred, and simultaneously withdrawing from the bottom of the decomposer a hydrogen fluoride solution that does not substantially contain boron trifluoride (boron trifluoride/hydrogen fluoride mole ratio being approximately 0.002–0.040) together with xylenes. The inventors have also discovered that a hydrocarbon diluent, when allowed to co-exist in the system, will help produce still better results. The present invention is further explained in detail in the following.

BRIEF DESCRIPTION OF THE DRAWINGS

FIG. 1 shows a gas-liquid equilibrium isobar under a pressure of 5 kg./cm.$^2$ (absolute pressure), and FIG. 2 shows the same under a pressure of 10 kg./cm.$^2$ (absolute pressure), both measured with 0.1 mole of m-xylene being present vs. 1 mole of hydrogen fluoride.

DETAILED EXPLANATION OF THE INVENTION

Figure 1:
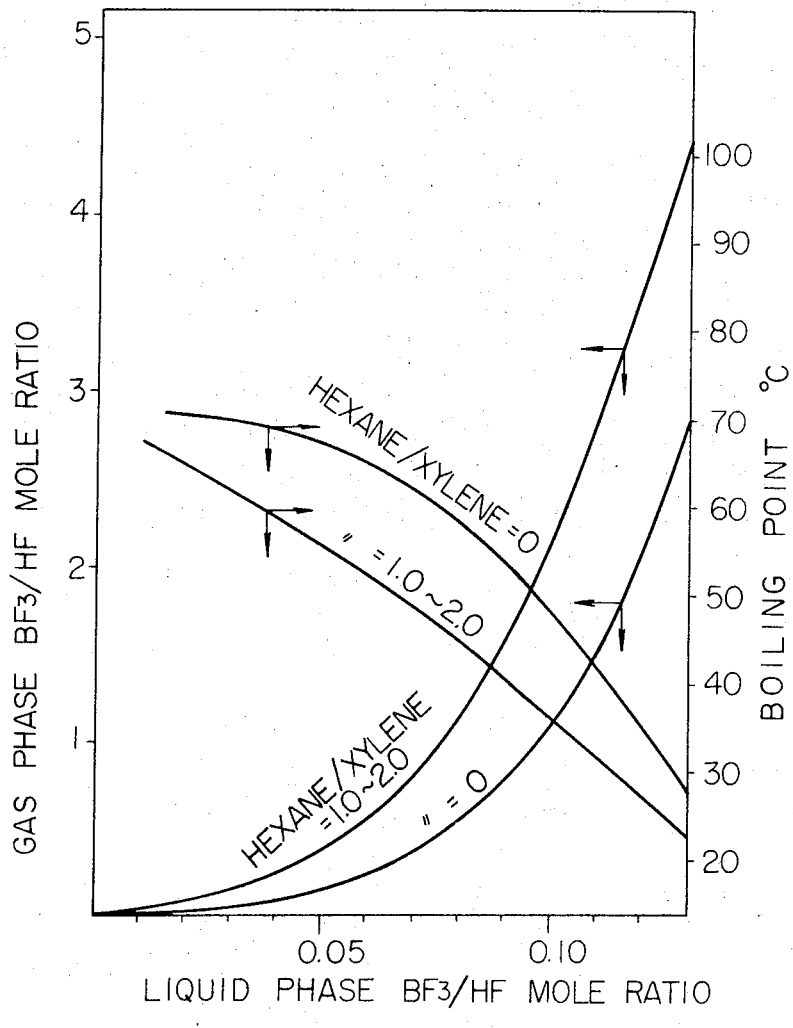
FIG. 1 and FIG. 2 illustrate the boiling point of the complex solution and vapor composition (boron trifluoride/hydrogen fluoride mole ratio) in equilibrium with the solution at varying mole ratios of boron trifluoride/hydrogen fluoride.
Figure 2:
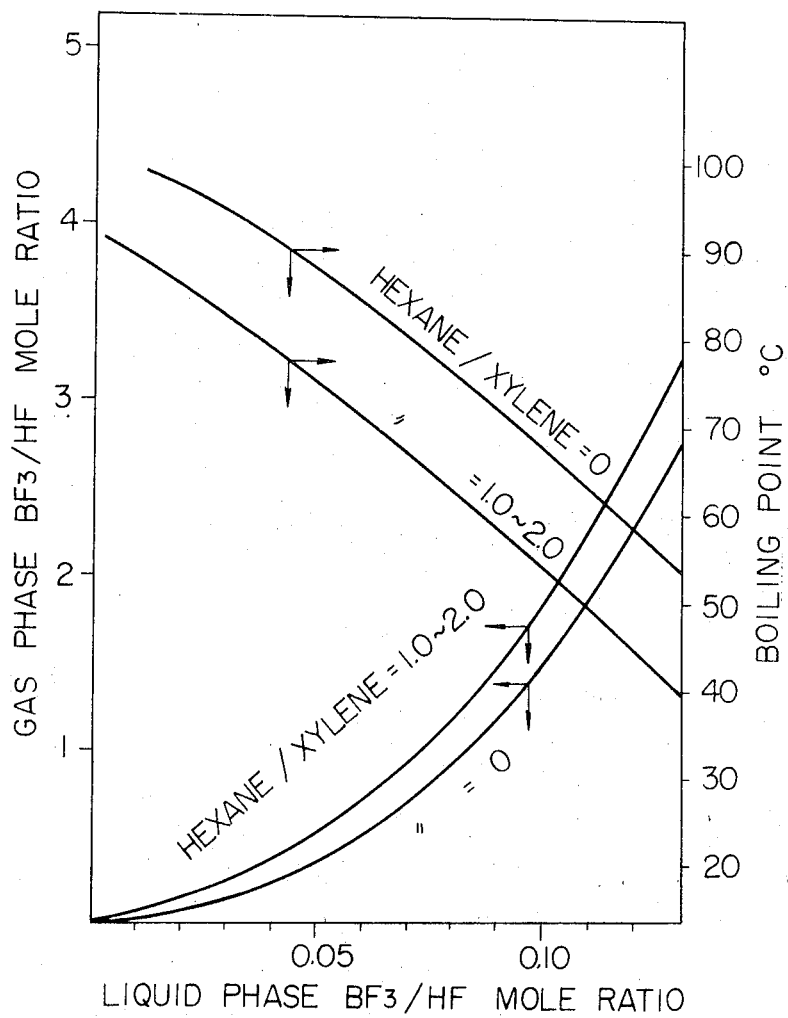

Now, referring to the figures, it is indicated that an increase in the mole ratio of boron trifluoride/hydrogen fluoride of the complex solution will abruptly increase the tendency to selectively allow boron trifluoride to enter into the gas phase. This makes it possible for the complex solution to be decomposed by the multi-stage countercurrent gas-liquid contactor, and allow to recover $BF_3$ rich gas as the overhead gas from the contactor and HF and xylenes from the bottom thereof in liquid state. The mole ratio of boron trifluoride/hydrogen fluoride may be continuously reduced from the top to the bottom of the decomposer. In this instance, as illustrated by FIG. 2 as well as FIG. 1, hydrocarbon diluent present in the system (hexane was used in the figures) further increases the tendency for boron trifluoride to selectively enter into the gas phase. Hydrocarbon diluents for use include aliphatic saturated hydrocarbons and alicyclic saturated hydrocarbons of $C_5$–$C_7$, and aromatic hydrocarbons of $C_6$–$C_7$. The feeding amount of the diluent is adequate if it is 0.5 mole or more against 1 mole of xylenes contained in the complex solution, with 1.0–2.0 times (mole) being preferred. Heating is conducted under a pressure of 2–30 kg./cm.$^2$ (absolute pressure), with 3–15 kg./cm.$^2$ (absolute pressure) being preferred. Accordingly, the temperature will be in the neighborhood of the boiling point of xylene-boron trifluoride-hydrogen fluoride complex solution under said pressure (see FIG. 1 and FIG. 2). Decomposition under atmospheric pressure is not highly desirable from the view point of equilibrium. The decomposer for use may be any apparatus of any design as long as it is capable of functioning as a multi-stage countercurrent gas-liquid contactor, and various types of packed column and plate column are suitable for such use.

Thus, by using a multi-stage countercurrent gas-liquid contactor as a decomposer and by, heating the bottom of the decomposer, it is made possible for liquid hydrogen fluoride which does not substantially contain boron trifluoride to be continuously withdrawn from the bottom of the decomposer.

The mole ratio of boron trifluoride/hydrogen fluoride in the withdrawn solution, varies depending on the amount of xylenes contained in the hydrogen fluoride solution. However, when a complex solution obtained by extraction of xylenes is used as the raw material, it is advisable to withdraw the bottom product while maintaining the mole ratio of boron trifluoride/hydrogen fluoride in the range of 0.005–0.040. In this case, 0.005 or less is not practicable, while anything above 0.040 is not advisable for the extracting agent to be reused. On the other hand, when a disproportionation reaction product of toluene is used as the raw material, the amount of xylenes in the raw material is small (xylene/hydrogen fluoride mole ratio being .05 or less), therefore, withdrawal of the bottom stream may be carried out with the mole ratio of boron trifluoride/hydrogen fluoride in the withdrawn liquid being in the range of 0.002–0.040.

The withdrawn liquids obtained from the bottom of the decomposer (bottom product), preferably after having been cooled to within $-30$ to $+30°$ C., is allowed to settle. It then separates into a hydrogen fluoride phase (which contains a small amount of boron trifluoride) and a hydrocarbon phase (xylenes or xylenes and diluent). In this instance, the small amount of boron trifluoride contained in the hydrogen fluoride phase forms a complex with xylenes and causes xylenes to enter into the hydrogen fluoride phase. The presence of said diluent, however, contributes towards minimizing a tendency for combining boron trifluoride, hydrogen fluoride and xylenes. This is to say that when the diluent is allowed to be present in an amount 1–2 times greater than that of xylenes (mole), combination of the xylenes and boron trifluoride is reduced from approximately 1.5 (mole ratio of xylene/$BF_3$) to approximately 0.9–1.0, thereby reducing the amount of xylenes mixing into the hydrogen fluoride phase. The physical dissolution of the xylenes and diluent in the hydrogen fluoride phase and also that of the hydrogen fluoride and boron trifluoride in the hydrocarbon phase are both such that they may be ignored for practical purposes.

By a process such as the one described above, it is possible to decompose said complex without causing all of the hydrogen fluoride in the solution of hydrogen fluoride-boron trifluoride xylenes complex to be vaporized and to obtain hydrogen fluoride in liquid form that does not substantially contain boron trifluoride, and a gas having a boron trifluoride concentration of 20–90%, that is the mole ratio of boron trifluoride/hydrogen fluoride is within a range of 0.25–9.0 (balance, hydrogen fluoride and a slight amount of the diluent). Further, according to the present invention it is possible to isomerize m-xylene simultaneously under conditions conducive to such decomposition as mentioned above. To carry out the isomerization, pressure needs to be at 3–30 kg./cm.$^2$ (absolute pressure), with 5–15 kg./cm.$^2$ (absolute pressure) being preferred and residence time is 5–120 minutes, with 10–80 minutes being preferred. For this reason a plate tower having a larger liquid holding capacity, rather than a packed tower, is better suited for use as the decomposer. The presence of the diluent promotes isomerization reaction of m-xylene to a xylene isomer other than m-xylene by extracting and removing p-xylene and o-xylene formed by isomerization of m-xylene from the hydrogen fluoride phase under reaction to the diluent phase.

According to the present invention it is possible to recover in the form of liquid a predominant portion of the hydrogen fluoride present in the system without causing it to be vaporized. Not only does this save a substantial amount of energy, but it is also advantageous in that a low temperature heat energy such as spent steam may be used for heating purposes. A heat source at a temperature which about equals the boiling point of hydrogen fluoride can be adequately used. Also, it helps prevent corrosion of plant equipment. In particular, when m-xylene is simultaneously isomerized, steps for subsequent isomerization may be simplified or completely done away with, thereby rendering the present invention highly effective.

EXAMPLES 1–6

Dixon's packing material having a diameter of 2 mm. was packed 400 mm. high in a tower having an inside diameter of 22 mm. and used as the decomposer, the bottom thereof was equipped with a 200 ml. kettle which is heated electrically from outside. A complex solution of hydrogen fluoride, boron trifluoride and m-xylene, and n-hexane were individually fed through the top of the tower, the hexane being used as diluent where needed, for thermal decomposition under pressure. The results were as shown in Table 1.

Overhead gas was continuously withdrawn and collected after having been absorbed in cold water. Results of the analysis of said gas are given in the table. The product at the bottom of the tower was collected in a receiver by causing the kettle at the bottom of the tower to continuously overflow, and was subsequently allowed to settle for phase separation after having been cooled to 0° C.

EXAMPLES 7–8

A perforated plate tower having an inside diameter of 45 mm. and 15 stages was employed as the decomposer. Each stage was capable of holding 20 ml. of liquid. A 50 ml. kettle electrically heated from outside was placed at the bottom of the tower. The tower was operated in the same way as in Examples 1–6 and results as shown in Table 1 were obtained.

What is claimed is:
1. A process for decomposing a solution of hydrogen fluoride-boron trifluoride-xylene complex, characterized by heating said complex under a pressure of 2–30 kg./cm.² (absolute pressure) and for a residence time of 1–120 minutes with the use of a decomposer which is a multi-stage countercurrent gas-liquid contactor, withdrawing from the top of the decomposer a gas, having a mole ratio of boron trifluoride to hydrogen fluoride of from about 0.25 to about 0.9 and withdrawing from the bottom of the decomposer, together with xylenes, a liquid having a mole ratio of boron trifluoride to hydrogen fluoride of from about 0.002 to about 0.04.

2. A process of claim 1, wherein said complex is so heated in the presence of a hydrocarbon diluent.

3. A process of claim 2, wherein said hydrocarbon diluent is selected from the group consisting of an aliphatic saturated hydrocarbon and an alicyclic saturated hydrocarbon of $C_5$–$C_7$, and an aromatic hydrocarbon of $C_6$–$C_7$.

4. A process of claim 3, wherein the amount of said hydrocarbon diluent is 0.5 mole or more per 1 mole of xylenes present in the complex solution.

5. A process of claim 1, wherein said solution of hydrogen fluoride-boron trifluoride-xylene complex is an extract obtained by contacting mixed xylenes containing m-xylene, o-xylene, p-xylene and ethyl benzene with hydrogen fluoride-boron trifluoride extractant to form an m-xylene rich extract, and the molar ratio of boron trifluoride/hydrogen fluoride of the decomposer bottom stream is within a range of 0.005–0.040.

6. A process of claim 1, wherein said solution of hydrogen fluoride-boron trifluoride-xylene complex is a disproportionation reaction product obtained by heating toluene in the presence of hydrogen fluoride-boron trifluoride catalyst and the molar ratio of boron trifluoride/hydrogen fluoride of the decomposer bottom stream is within a range of 0.002–0.040.

7. A process for decomposing a solution of hydrogen fluoride-boron trifluoride m-xylene complex and simultaneously isomerizing m-xylene of said complex, characterized by heating said complex under a pressure of 3–30 kg./cm.² (asbolute pressure) and for a residence time of 1–120 minutes with the use of a decomposer which is a multi-stage countercurrent gas-liquid contactor, whereupon m-xylene is isomerized to an isomer thereof, withdrawing from the top of the decomposer a gas, having a mole ratio of boron trifluoride to hydrogen fluoride of from about 0.25 to about 9.0, and withdrawing from the bottom of the decomposer, together with a mixture of xylenes containing a higher concentration of isomers of m-xylene than in said complex, a liquid having a mole ratio of boron trifluoride to hydrogen fluoride of from about 0.002 to about 0.04.

8. A process of claim 7, wherein said complex is so heated in the presence of a hydrocarbon diluent.

9. A process of claim 8, wherein said hydrocarbon diluent is selected from the group consisting of an aliphatic saturated hydrocarbon and an alicyclic saturated hydrocarbon of $C_5$–$C_7$, and an aromatic hydrocarbon of $C_6$–$C_7$.

10. A process of claim 9, wherein the amount of said hydrocarbon diluent is 0.5 mole or more per 1 mole of xylenes present in the complex solution.

References Cited
UNITED STATES PATENTS

| | | | |
|---|---|---|---|
| 3,493,627 | 2/1970 | Itoh et al. | 260—674 |
| 3,499,946 | 3/1970 | Ueno et al. | 260—674 |
| 3,512,931 | 5/1970 | Ueno et al. | 260—674 |
| 3,515,768 | 6/1970 | Ueno et al. | 260—674 |

CURTIS R. DAVIS, Primary Examiner

U.S. Cl. X.R.

260—668 A